(12) United States Patent
Lin et al.

(10) Patent No.: US 7,050,840 B2
(45) Date of Patent: May 23, 2006

(54) WIRELESS TRANSMISSION APPARATUS

(75) Inventors: Ying-Chien Lin, Hsinchu (TW); Syu Ding-Jyan, Hsinchu (TW)

(73) Assignee: ADMTEK Incorporated, Hsinchu (TW)

( * ) Notice: Subject to any disclaimer, the term of this patent is extended or adjusted under 35 U.S.C. 154(b) by 219 days.

(21) Appl. No.: 10/687,365

(22) Filed: Oct. 16, 2003

(65) Prior Publication Data

US 2004/0235517 A1 Nov. 25, 2004

(30) Foreign Application Priority Data

May 21, 2003 (TW) .................. 92113763 A

(51) Int. Cl.
*H04B 1/38* (2006.01)
*H04B 1/04* (2006.01)
*H04B 1/16* (2006.01)
*H04M 1/00* (2006.01)

(52) U.S. Cl. .................. 455/574; 455/550.1; 455/552.1; 455/554.2; 455/556.1; 455/572; 455/127.5; 455/343.2

(58) Field of Classification Search ............. 455/426.2, 455/41.2, 41.3, 500, 507, 514, 74.1, 88, 550.1, 455/552.1, 553.1, 554.2, 555, 556.1, 556.2, 455/557–559, 561, 571–574, 118, 124, 127.1, 455/127.5, 129; 713/300, 310, 320, 340
See application file for complete search history.

(56) References Cited

U.S. PATENT DOCUMENTS

| | | | | | |
|---|---|---|---|---|---|
| 5,465,400 | A | * | 11/1995 | Norimatsu | .................. 455/76 |
| 5,815,821 | A | * | 9/1998 | Pettersson | .................. 455/574 |
| 5,970,062 | A | * | 10/1999 | Bauchot | .................. 370/310.2 |
| 6,211,649 | B1 | * | 4/2001 | Matsuda | .................. 320/115 |
| 6,216,188 | B1 | * | 4/2001 | Endo et al. | .................. 710/302 |
| 6,400,958 | B1 | * | 6/2002 | Isomursu et al. | .................. 455/466 |
| 6,516,418 | B1 | * | 2/2003 | Lee | .................. 713/320 |
| 6,633,932 | B1 | * | 10/2003 | Bork et al. | .................. 710/72 |
| 6,663,420 | B1 | * | 12/2003 | Xiao | .................. 439/502 |
| 6,904,488 | B1 | * | 6/2005 | Matsumoto et al. | .................. 710/313 |
| 2004/0185777 | A1 | * | 9/2004 | Bryson | .................. 455/41.1 |

* cited by examiner

*Primary Examiner*—Nick Corsaro
*Assistant Examiner*—Meless Zewdu
(74) *Attorney, Agent, or Firm*—Seyfarth Shaw LLP

(57) ABSTRACT

A wireless transmission apparatus comprises a wired network port for exchanging data with a computer, a wireless network port including a radio frequency circuit module, a processing unit for converting the format of the data transmitted between the wired network port and the wireless network port, and a power port electrically connected to a universal series bus (USB) port of the computer by which the wireless transmission apparatus is powered. The wireless transmission apparatus can further comprise a power controller electrically connected to the power port, wherein the power controller comprises a voltage transformer adapted to convert a voltage of the power port into a voltage suitable for the operation of the wireless transmission apparatus and a power-saving controller adapted to suspend the power supply to the radio frequency circuit module according to a power control signal generated by the processing unit.

6 Claims, 7 Drawing Sheets

WIRELESS TRANSMISSION APPARATUS

BACKGROUND OF THE INVENTION (A) Field of the Invention

The present invention relates to a wireless transmission apparatus, and more particularly, to a wireless transmission apparatus, which is powered by a computer through a universal series bus (USB) port.

(B) Description of the Related Art

FIG. 1 is a schematic diagram showing the wireless connection between a computer 10 in a wireless local area network (WLAN) 22 and a wide area network (WAN) 99 according to the prior art. As shown in FIG. 1, the computer 10 is positioned within the WLAN 22, and connected to the WAN 99 through a wireless-LAN access point (AP) 20. The AP 20 is powered by commercial power through a power transformer.

FIG. 2a is a functional block diagram of a wireless network card 30 installed in the computer 10 according to the prior art. As shown in FIG. 2a, the computer 10 comprises a processor 12, a chipset 14, a PCMCIA controller 16 and a PCMCIA port 18. The wireless network card 30 can exchange data with the computer 10 through the PCMCIA interface, and uses IEEE 802.11 communication protocol to exchange data with the AP 20. The wireless network card 30 comprises a system bus 32, an interface processing unit 34, a PCMCIA port 38 electrically connected to the computer 10, an antenna 36 for transmitting data to the AP 20 and a radio frequency (RF) circuit module 39 electrically connected to the antenna 36. The interface processing unit 34 is used to convert the data from the PCMCIA interface of the computer 10 into the format of IEEE 802.11, or convert the data from the AP 20 into the format of the PCMCIA interface.

FIG. 2b is a functional block diagram of a wireless network transmission module 11 embedded in the computer 10 according to the prior art. This design may become the mainstream in the future market, however the product price is high and personal computer (PC) users can not refit their PCs to use this design for accessing data from Internet. Consequently, the above-mentioned wireless network cards are still dominant in the market. As shown in FIG. 2b, the processor 12 and the chipset 14 of the computer 10 communicate with the wireless network transmission module 11 directly through a bus of the computer, and then conduct wireless data transmission by the embedded antenna, wherein the wireless network transmission module 11 can consist of a wireless network controller 13 and a radio frequency circuit 15.

Generally speaking, a driver of the processor drives the operation of the wireless network card 30. Therefore, the computer can not be connected to the AP 20 through a wireless network card 30 unless such a driver is installed in the computer 10. During the driver installation, users must check whether or not the driver of the wireless network card 30 supports the operating system of the computer 10. Windows, Linux and Unix are the primary operating systems for the time being, wherein there are several versions for the Windows operating system, such as 98/ME/NT/2000/XP/CE/Pocket. To access data from the wireless network through the wireless network card 30, users must check whether or not the driver supports the operating system of the computer 10 when installing the driver of the wireless network card 30, and the installed driver must be the correct version for the computer 10. The installation of drivers are complicated and users may be confused, thus a wireless transmission apparatus that does not require any driver installation and supports Plug & Play function is in demand. For the moment, wireless network transmission apparatus is designed as an independent apparatus with Plug & Play function, such as the Ethernet, wherein the apparatus needs an independent power supply and is powered by commercial power through an external transformer.

FIG. 3a is a schematic diagram showing the connection between a wireless network transmission apparatus 90 and a computer 60 according to the prior art. As shown in FIG. 3a, the computer 60 exchanges data with the wireless transmission apparatus 90 via the data transmission line 72. Since the wireless transmission apparatus 90 is powered by commercial power, users must prepare a power line and find a power plug to access data from the wireless LAN every time and everywhere when they want to use it. This is really inconvenient for those who have no regular work location and need to change workplaces frequently. Obviously, the wireless network access scheme of the prior art needs to be improved.

SUMMARY OF THE INVENTION

The primary objective of the present invention is to provide a wireless transmission apparatus, which is powered by a computer through a universal series bus port.

The secondary objective of the present invention is to provide a wireless transmission apparatus, which can exchange data with a computer via a common RJ45 connector and twisted-pair wires in the mode of TCP/IP.

In order to achieve the above-mentioned objectives and avoid the problems of the prior art, the present invention provides a wireless transmission apparatus, which comprises a wired network port for exchanging data with a computer, a wireless network port including a radio frequency circuit module, a processing unit for converting the format of the data transmitted between the wired network port and the wireless network port, and a power port electrically connected to a universal series bus port of the computer by which the wireless transmission apparatus is powered. The wireless network port comprises an antenna for exchanging data with a wireless network, and the radio frequency circuit module is electrically connected to the antenna. The wireless transmission apparatus of the present invention is powered by the computer through the universal series bus port.

The wireless transmission apparatus of the present invention further comprises a power controller electrically connected to the power port. The power controller comprises a voltage transformer and a power-saving controller. The voltage transformer can convert the voltage of the power port to a predetermined voltage, wherein the voltage of the power port is 5 volts and the predetermined voltage can be 3.3 volts or other working voltage suitable for the operation of the wireless transmission apparatus. The power-saving controller can suspend the power supply to the radio frequency circuit module according to a power control signal generated by the processing unit in order to avoid the consumption of computer power and to get more practical commercial values.

Compared with the prior art, the present invention uses the computer to provide power through the USB port for the wireless transmission apparatus, thus it is not necessary for users to prepare an extra power supply device. In addition, the wireless transmission apparatus can use the standard protocol to exchange data with the computer through a general LAN wire, thus no driver is required to be installed and the Plug & Play function can be fulfilled. Consequently, the present invention is much more convenient than the prior art.

BRIEF DESCRIPTION OF THE DRAWINGS

Other objectives and advantages of the present invention will become apparent upon reading the following description and upon reference to the accompanying drawings in which.

DETAILED DESCRIPTION OF THE INVENTION

Figure 1:
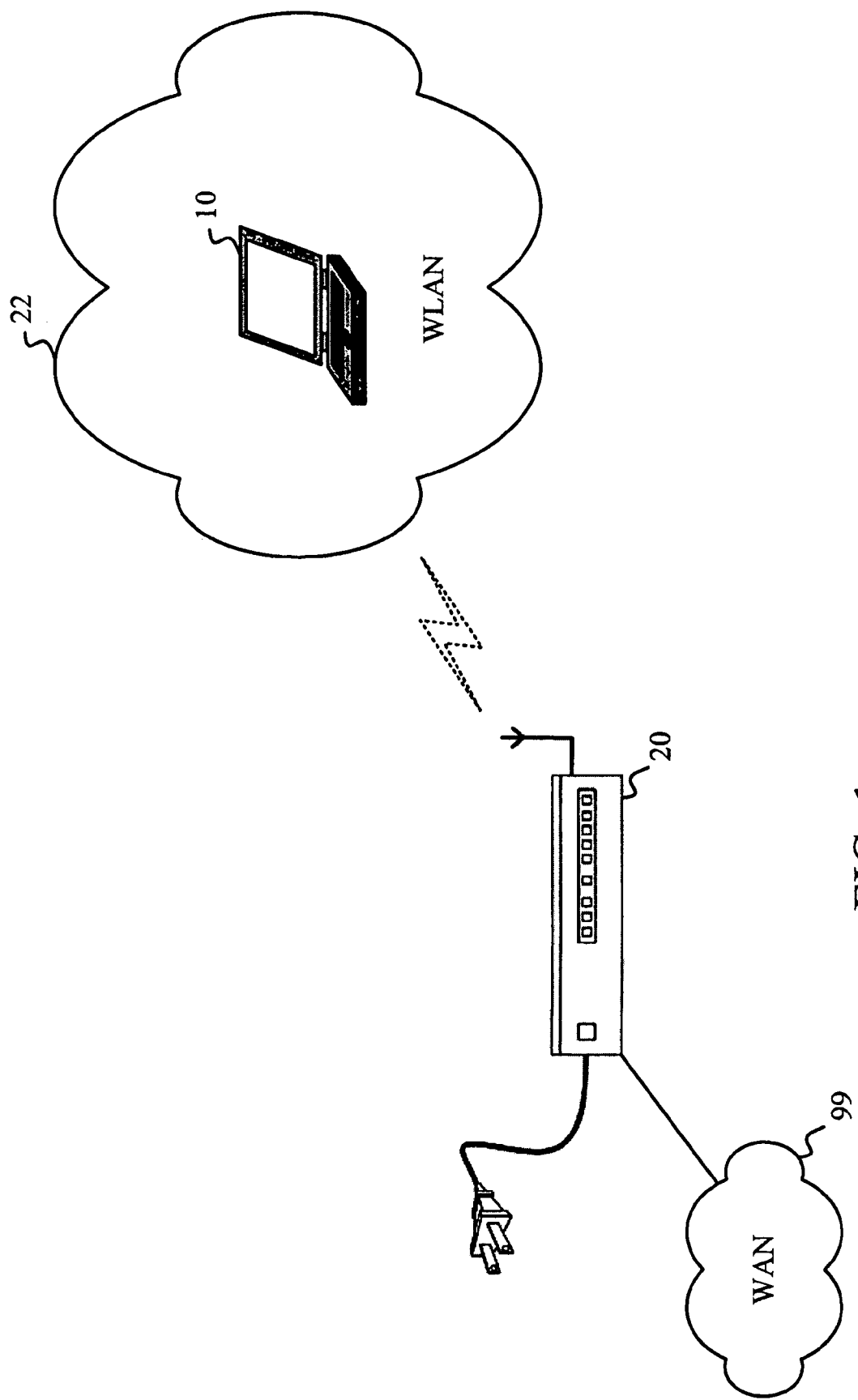
FIG. 1 is a schematic diagram showing the wireless connection between a computer in a wireless local area network (WLAN) and a wide are network (WAN) according to the prior art.
Figure 2A:
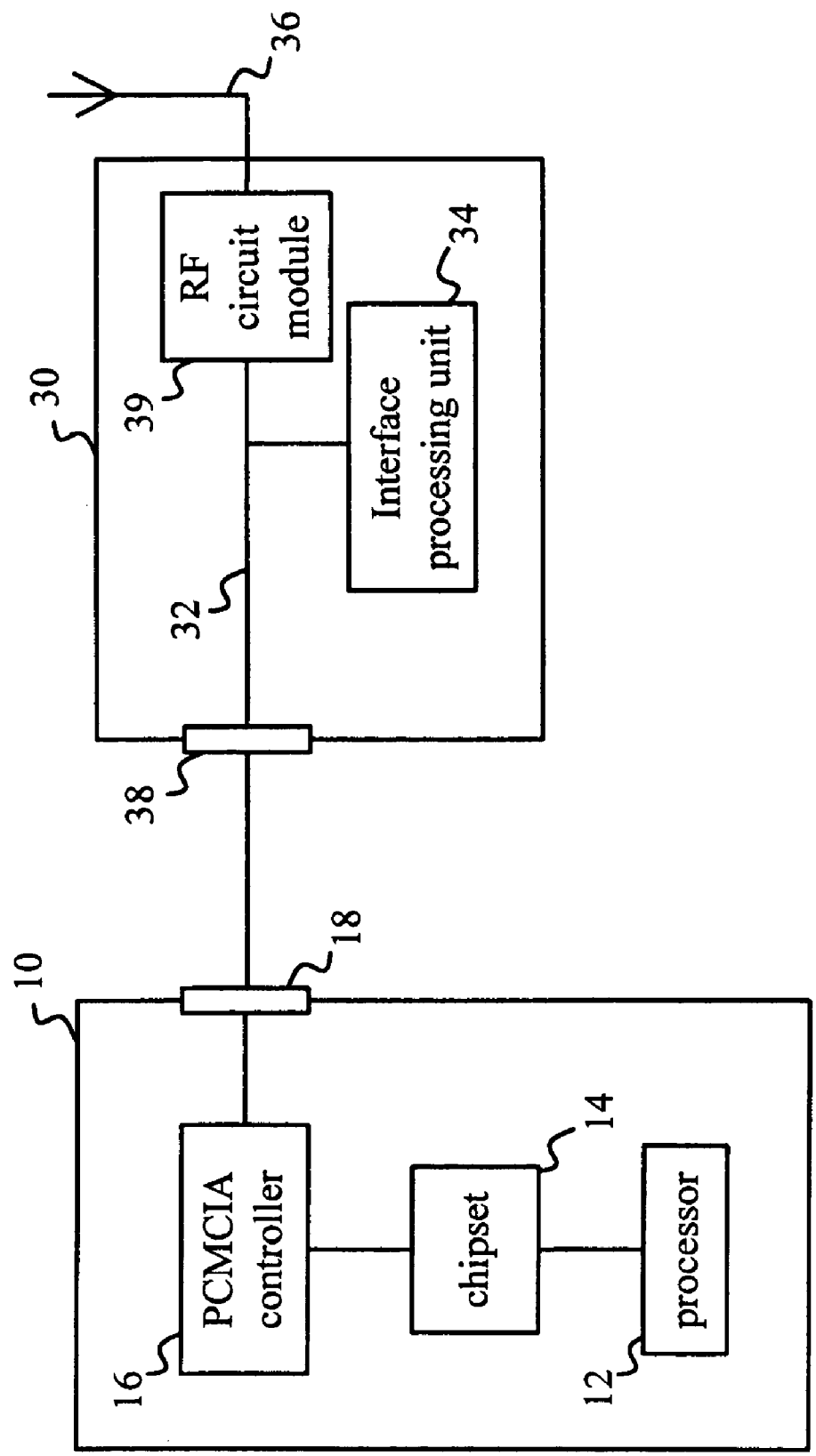
FIG. 2a is a functional block diagram of a wireless network card installed in computer according to the prior art.
Figure 2B:
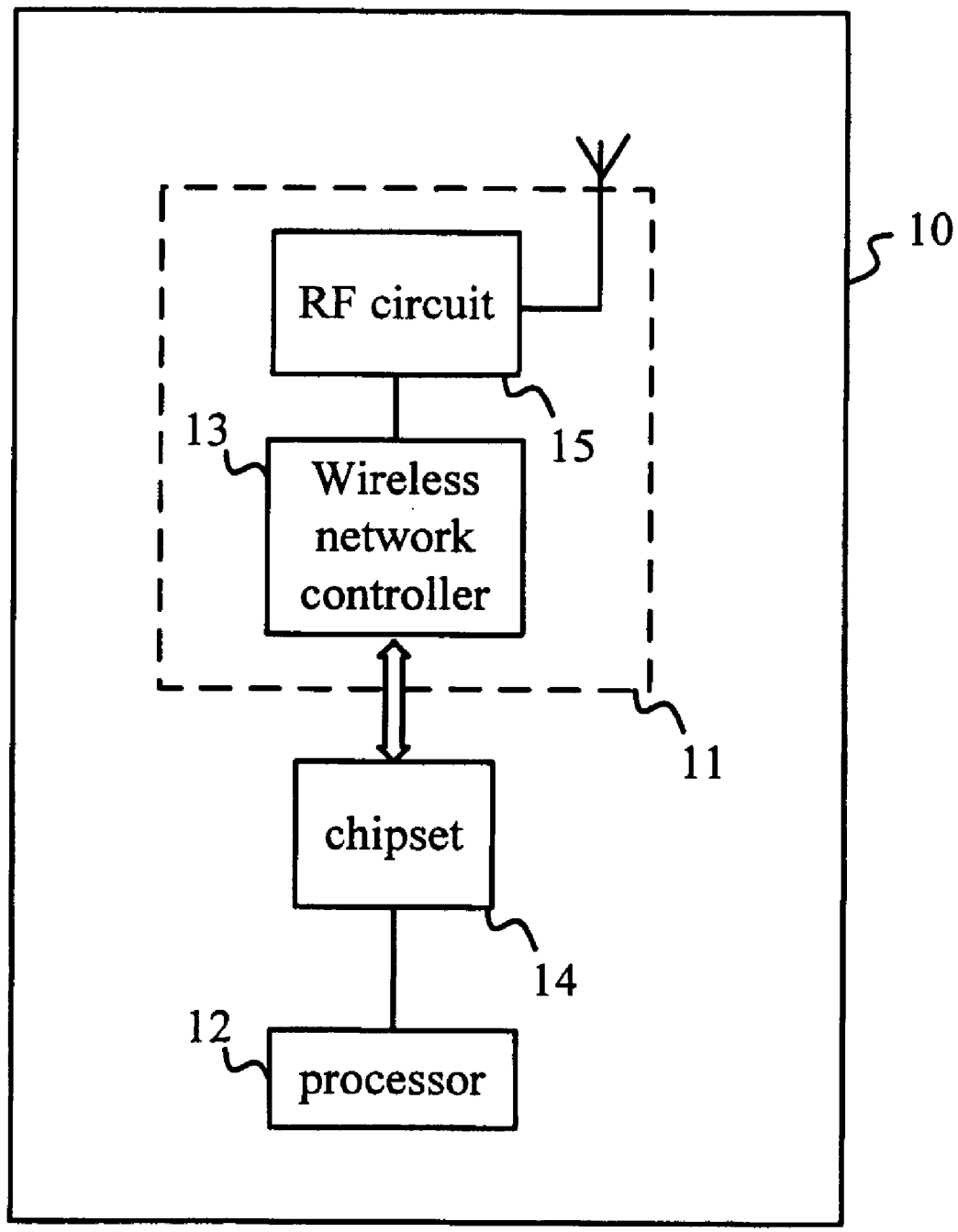
FIG. 2b is a functional block diagram of a wireless network transmission module embedded in the computer according to the prior art.
Figure 3A:
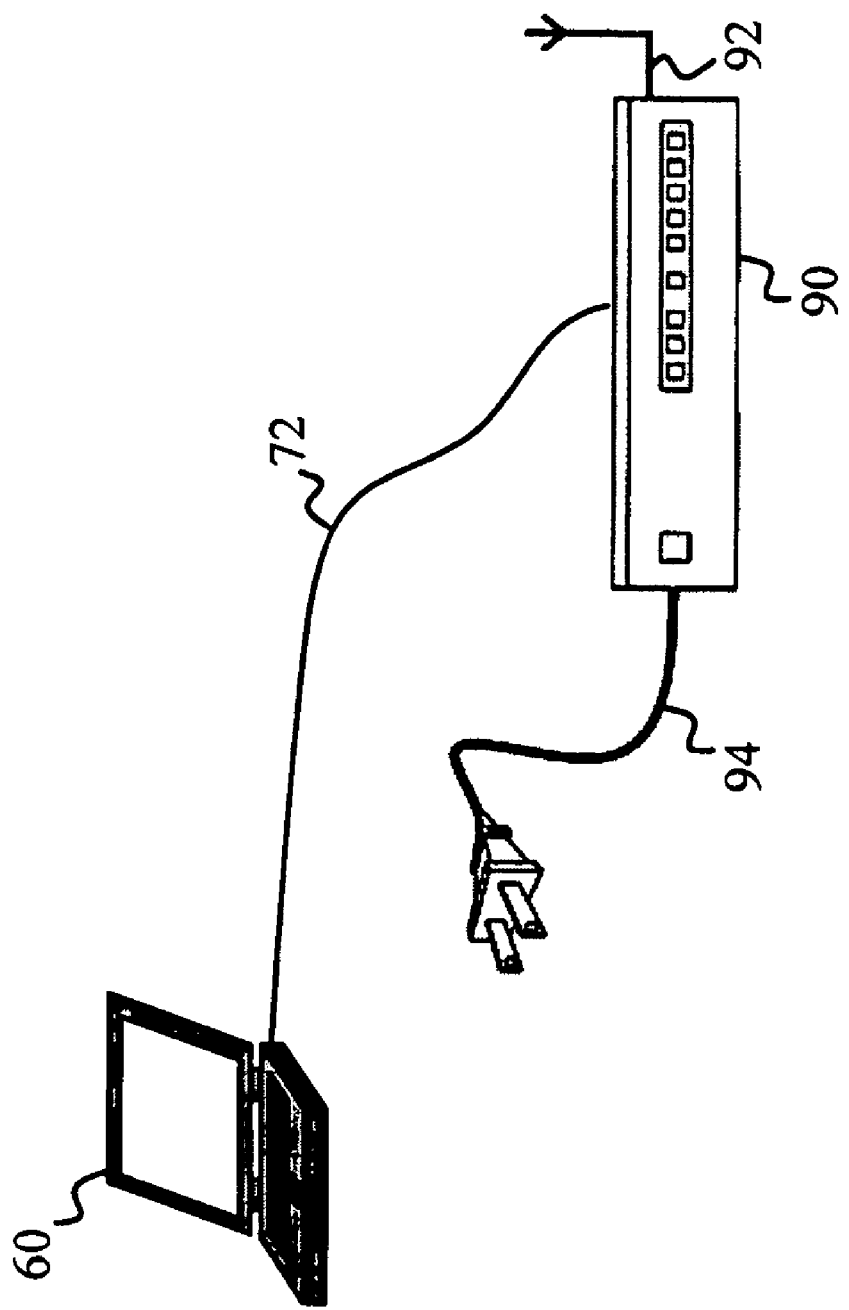
FIG. 3a is a schematic diagram showing the connection between a wireless network transmission apparatus and a computer according to the prior art.
Figure 3B:
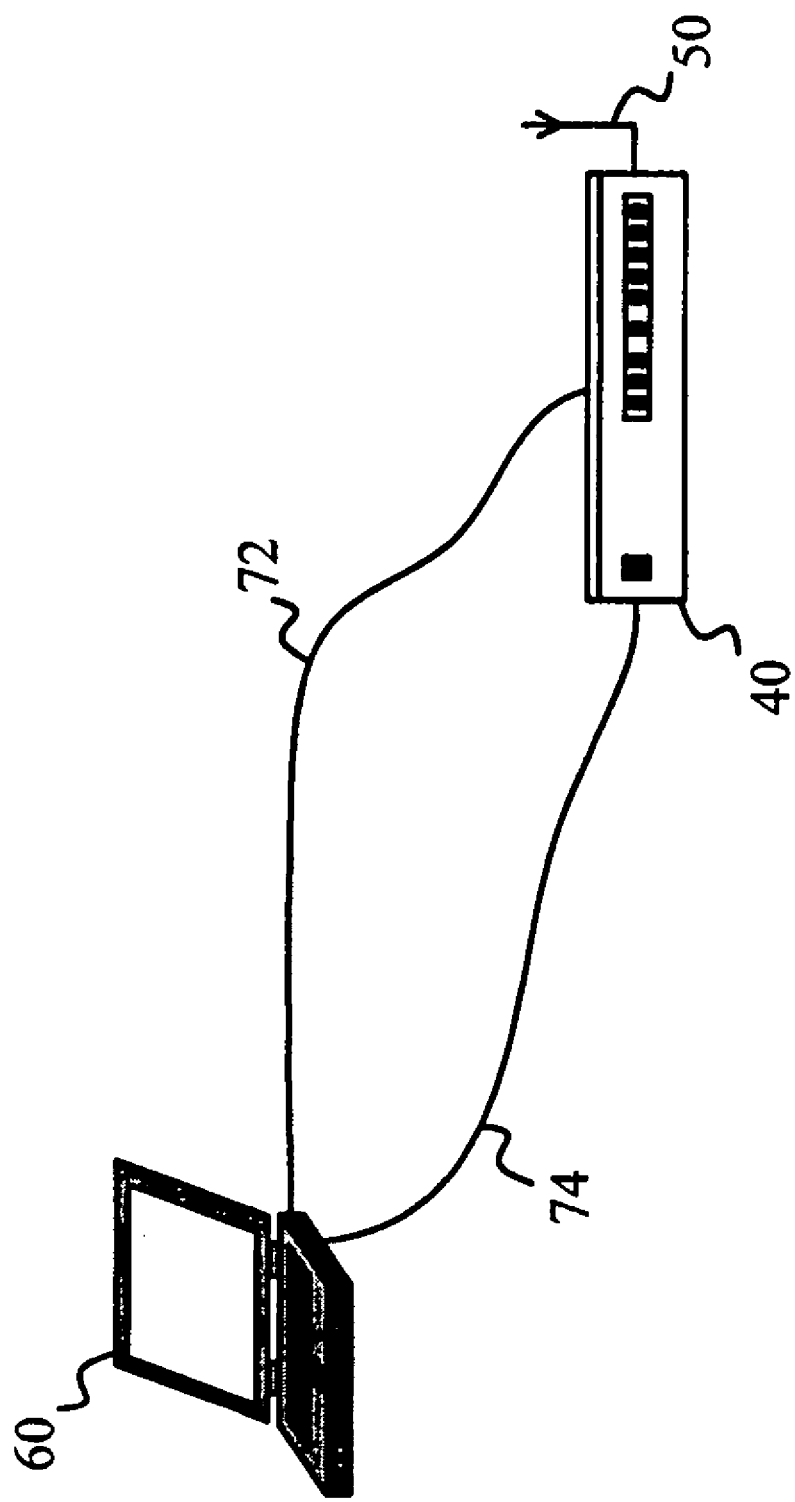
FIG. 3b is a schematic diagram showing the connection between a wireless transmission apparatus and a computer according to the present invention.

FIG. 3b is a schematic diagram showing the connection between a wireless transmission apparatus 40 and a computer 60 according to the present invention. As shown in FIG. 3b, the computer 60, such as a portable computer, provides power for the wireless transmission apparatus 40 through a power supply line 74. The wireless transmission apparatus 40 uses a data transmission line 72 to exchange data with the computer 60 and uses an antenna 50 to exchange data with a wireless LAN.

Figure 4:
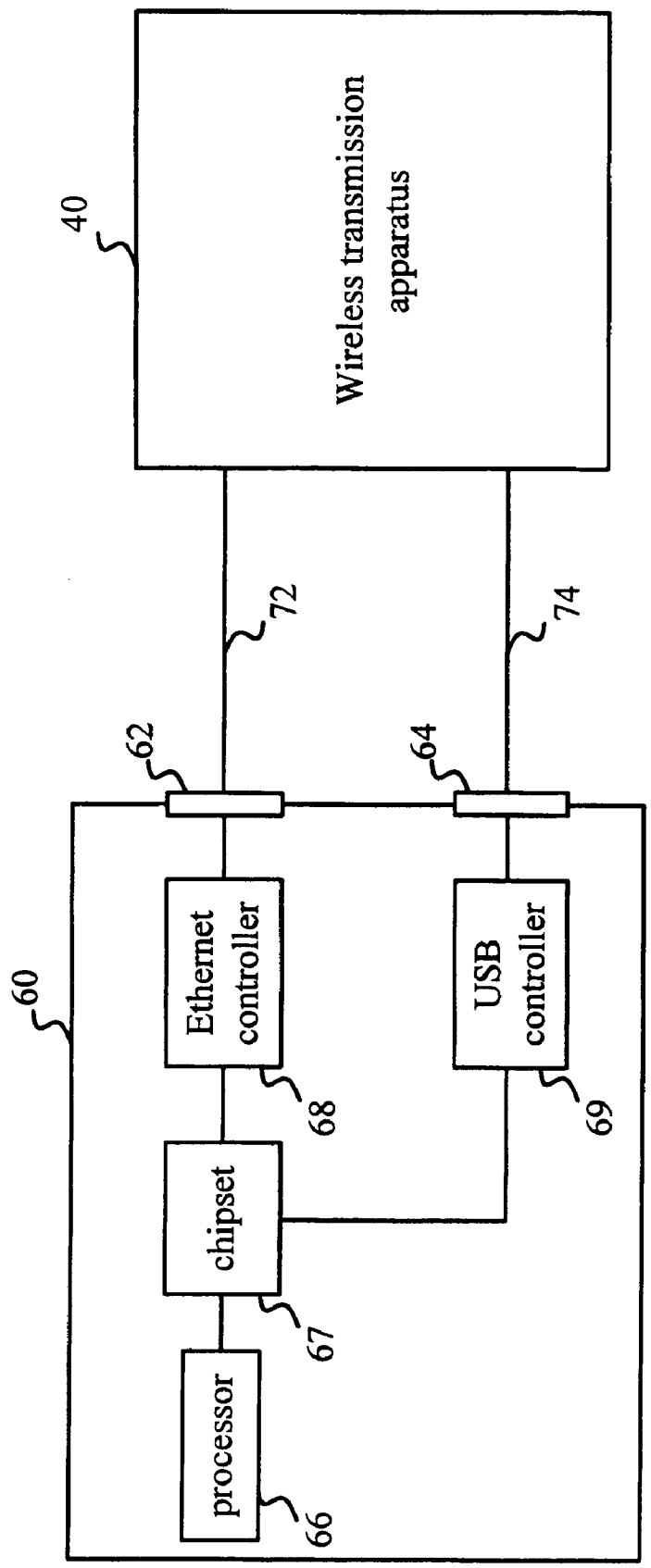
FIG. 4 is a functional block diagram of the computer shown in FIG. 3b.

FIG. 4 is a functional block diagram of the computer 60 shown in FIG. 3b. As shown in FIG. 4, the computer 60 comprises an Ethernet port 62, an Ethernet controller 68 electrically connected to the Ethernet port 62, a USB port 64, a USB controller 69 electrically connected to the USB port 64, a processor 66 and a chipset 67. The computer 60 exchanges data with the wireless transmission apparatus 40 through the data transmission line 72 via the Ethernet port 62, and provides power for the wireless transmission apparatus 40 through the power supply line 74 such as a USB connecting wire via the USB port 64.

Figure 5:
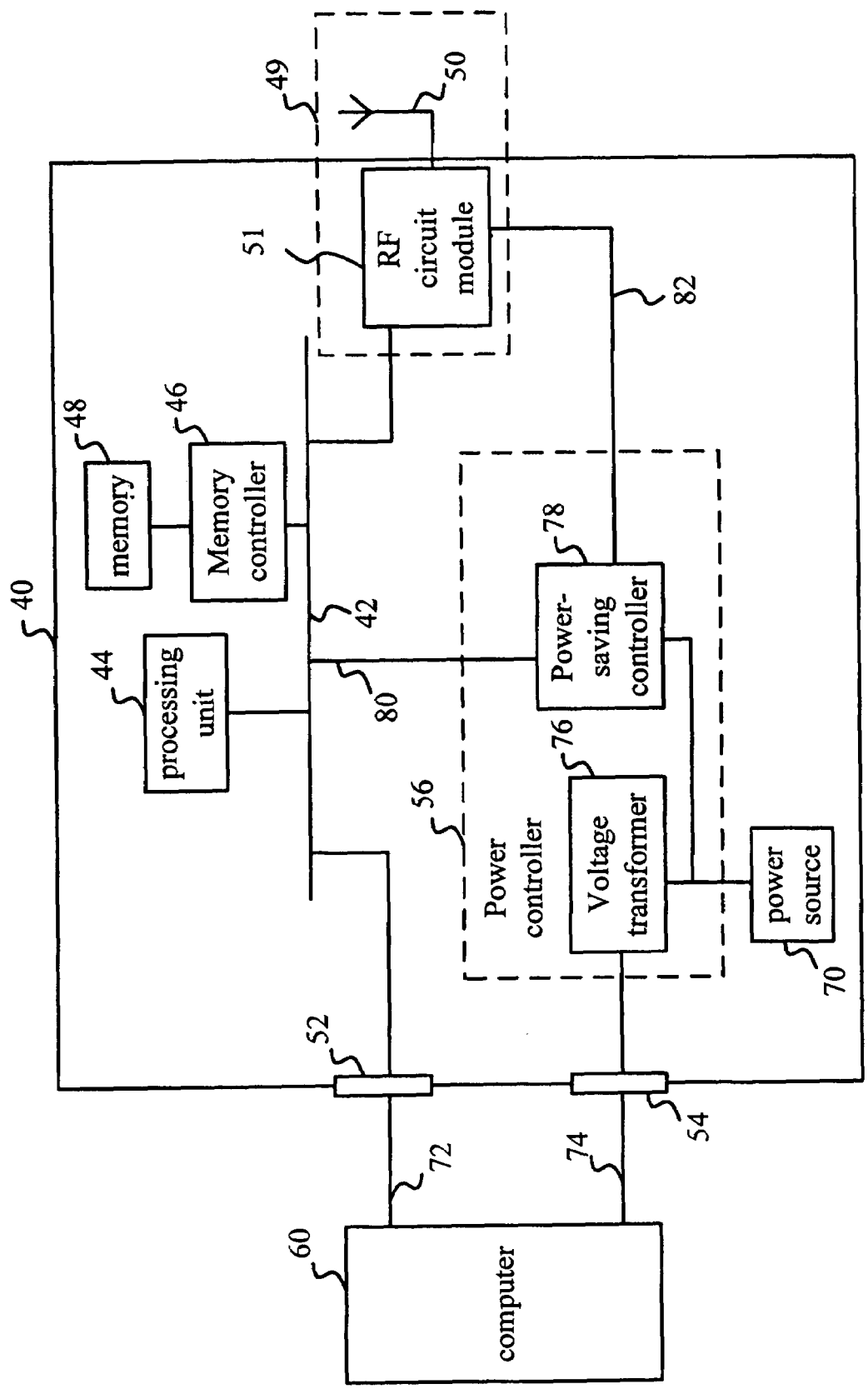
FIG. 5 is a functional block diagram of the wireless transmission apparatus shown in FIG. 3b.

FIG. 5 is a functional block diagram of the wireless transmission apparatus 40 shown in FIG. 3b. As shown in FIG. 5, the wireless transmission apparatus 40 comprises a system bus 42, a processing unit 44 electrically connected to the system bus 42, a wired network port 52 electrically connected to the system bus 42 and a wireless network port 49 electrically connected to the system bus 42. The wireless network port 49 comprises an antenna 50 and a radio frequency circuit module 51 electrically connected to the antenna 50. The radio frequency circuit module 51 transmits and receives data complied with IEEE 802.11 communication protocol through the antenna 50. The wired network port 52 is electrically connected to the Ethernet port 62 of the computer 60, and exchanges data with the computer 60 via the data transmission line 72 such as a common RJ45 connector and twisted pair wires. The processing unit 44 can convert the format of the data transmitted between the wired network port 52 and the wireless network port 49. For instance, the processing unit 44 can convert data complied with IEEE 802.3 network communication protocol into data complied with IEEE 802.11 communication protocol.

In order to avoid data loss, the wireless transmission apparatus 40 can further comprise a memory 48 and a memory controller 46 electrically connected to the system bus 42 for controlling the data access of the memory 48. When the processing unit 44 is busy, data that is ready to be transmitted to the computer 60 or the wireless LAN 84 from the wireless transmission apparatus 40 can be stored in the memory 48 temporarily, and the processing unit 44 can access the data later via the memory controller 46.

The wireless transmission apparatus 40 can further comprise a power port 54 and a power controller 56 electrically connected to the power port 54. The power port 54 is electrically connected to the USB port 64 of the computer 60 and the wireless transmission apparatus 40 can obtain the power thereby. The power controller 56 comprises a voltage transformer 76 and a power-saving controller 78. The voltage transformer 76 is used to convert the voltage of the power port 54 into a predetermined voltage, which will be then output to a power source 70. The power port receive an output power of the computer 60 through the power supply line 74, wherein the voltage of the output power can be 5.0 volts and the predetermined voltage can be 3.3 volts or other working voltage suitable for the operation of the wireless transmission apparatus. In order to reduce the complexity of FIG. 5, the power supply lines between processing unit 44, memory controller 46, memory 48 and power source 70 are not shown in FIG. 5. The power source 70 means the electrical power lines or layout where the other elements can get the predetermined voltage.

The power-saving controller 78 provides power for the radio frequency circuit module 51 through a power line 82. Since the operation of the radio frequency circuit module 51 consumes a lot of power, the present invention provides a solution to prevent the radio frequency circuit module 51 from consuming too much power of the computer 60 (particularly for a notebook computer). The processing unit 44 can transmit a power control signal 80 to the power-saving controller 78 of the power controller 56 when the wireless transmission apparatus 40 of the present invention operates in the power-saving mode. After receiving the power control signal 80, the power-saving controller 78 will suspend the power supply to the radio frequency circuit module 51.

Compared with the prior art, the present invention uses the computer to provide power through the USB port for the wireless transmission apparatus, thus it is not necessary for users to prepare an extra power supply device. In addition, the wireless transmission apparatus can use the standard protocol to exchange data with the computer through a general LAN wire, thus no driver is required to be installed and the Plug & Play function can be fulfilled. Consequently, the present invention is much more convenient than the prior art.

The above-described embodiments of the present invention are intended to be illustrative only. Numerous alternative embodiments may be devised by those skilled in the art without departing from the scope of the following claims.

What is claimed is:

1. A wireless transmission apparatus, comprising:
   a wired network port for exchanging data with a computer;

a wireless network port including a radio frequency circuit module;

a processing unit for converting the data format transmitted between the wired network port and the wireless network port; and a power port electrically connected to a universal series bus of the computer, by which the wireless transmission apparatus is powered; and a power controller electrically connected to the power port, wherein the power controller comprises a voltage transformer adapted to convert a voltage of the power port to a voltage suitable for the operation of the wireless transmission apparatus and a power-saving controller adapted to suspend the power supply to the radio frequency circuit module according to a power control signal generated by the processing unit.

2. The wireless transmission apparatus of claim 1, wherein the power port is a universal series bus port.

3. The wireless transmission apparatus of claim 1, further comprising a universal series bus wire connected to the power port.

4. The wireless transmission apparatus of claim 1, wherein the wired network port uses a communication protocol, which complies with the IEEE 802.3 standard.

5. The wireless transmission apparatus of claim 1, further comprising a memory for storing data transmitted between the wired network port an d the wireless network port.

6. The wireless transmission apparatus of claim 5, further comprising a memory controller for controlling data access of the memory.

* * * * *